(12) United States Patent
Sato et al.

(10) Patent No.: US 11,839,899 B2
(45) Date of Patent: Dec. 12, 2023

(54) COATING DIE AND COATING DEVICE

(71) Applicants: Panasonic Holdings Corporation, Osaka (JP); Sanyo Electric Co., Ltd., Osaka (JP)

(72) Inventors: Eisuke Sato, Osaka (JP); Takanori Maruo, Osaka (JP); Hiroshi Maruyama, Kyoto (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 0 days.

(21) Appl. No.: 17/797,006

(22) PCT Filed: Dec. 16, 2020

(86) PCT No.: PCT/JP2020/046916
§ 371 (c)(1),
(2) Date: Aug. 2, 2022

(87) PCT Pub. No.: WO2021/161649
PCT Pub. Date: Aug. 19, 2021

(65) Prior Publication Data
US 2023/0061304 A1    Mar. 2, 2023

(30) Foreign Application Priority Data
Feb. 12, 2020    (JP) ................................. 2020-021931

(51) Int. Cl.
*B05C 5/02*    (2006.01)
*B05C 9/06*    (2006.01)
*H01M 4/04*   (2006.01)

(52) U.S. Cl.
CPC ............ *B05C 5/027* (2013.01); *B05C 5/0254* (2013.01); *B05C 5/0266* (2013.01); *B05C 9/06* (2013.01); *H01M 4/0404* (2013.01)

(58) Field of Classification Search
CPC ......... B05C 5/027; B05C 9/06; B05C 5/0266; B05C 5/0254; H01M 4/0404; H01M 4/04; Y02E 60/10
(Continued)

(56) References Cited

U.S. PATENT DOCUMENTS 7,625,449 B2 * 12/2009 Pekurovsky ........ B05C 5/0254
                                                    118/DIG. 2

FOREIGN PATENT DOCUMENTS

JP    2019-107606 A    7/2019

OTHER PUBLICATIONS

JP2010005508, Contact type Slot Gun, Mochizuki et al, published Jan. 14, 2010 (Year: 2010).*

(Continued)

*Primary Examiner* — Laura Edwards
(74) *Attorney, Agent, or Firm* — Rimon P.C.; Tomoki Tanida

(57) ABSTRACT

A coating die includes: a first body; a second body; a discharge port; an intermediate member; a first shim to define a first flow passage; a second shim to define a second flow passage; and a confluence passage in which the first flow passage and the second flow passage join together and that communicates with the discharge port. The first shim includes a pair of first arms, and the second shim includes a pair of second arms. Each first arm includes a first female portion and a first male portion. Each second arm includes a second female portion and a second male portion. The first female portion and the second male portion are engaged
(Continued)

with each other, and the first male portion and the second female portion are engaged with each other.

5 Claims, 9 Drawing Sheets

(58) Field of Classification Search
USPC .......................................... 118/313, 411, 412
See application file for complete search history.

(56) References Cited

OTHER PUBLICATIONS

International Search Report issued in corresponding International Application No. PCT/JP2020/046916, dated Mar. 16, 2021, with English translation.

* cited by examiner

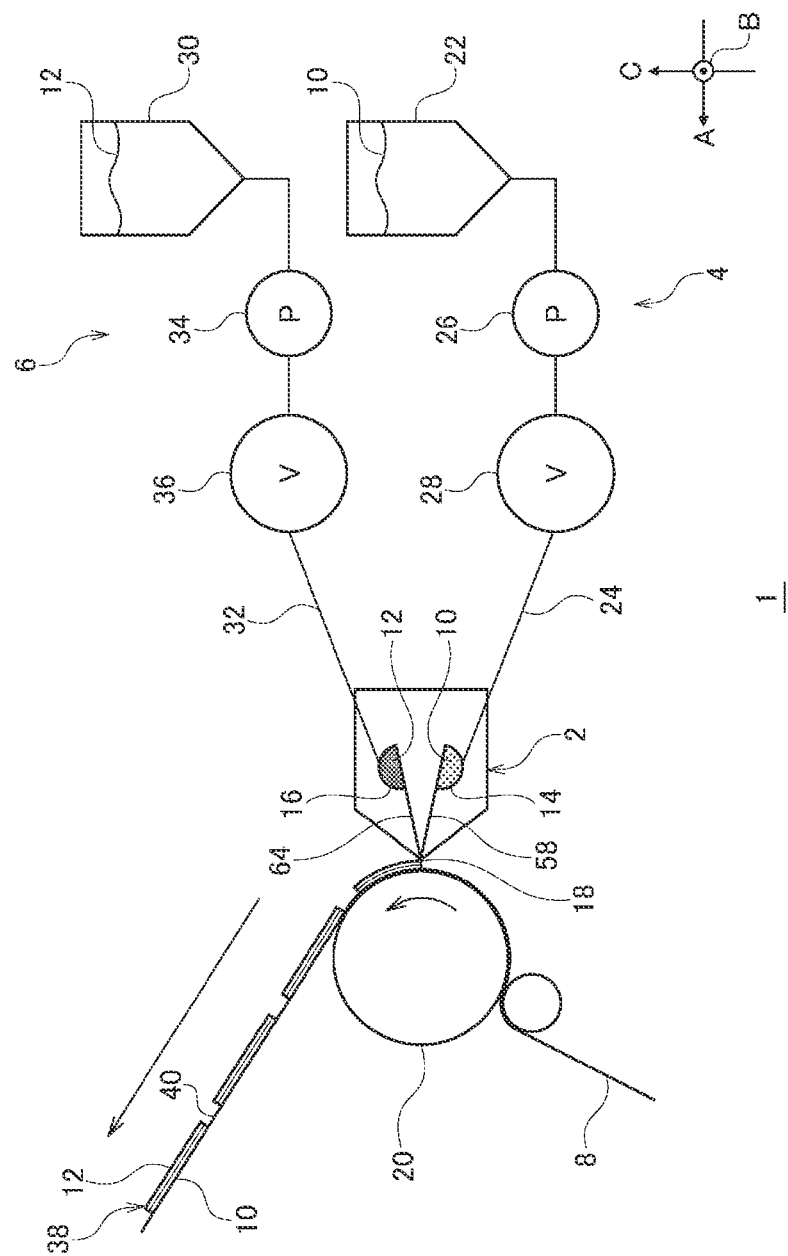

COATING DIE AND COATING DEVICE

TECHNICAL FIELD

The present disclosure relates to a coating die and a coating device.

BACKGROUND ART

In the field of lithium-ion secondary battery manufacturing, for example, a two-layer coating device has been conventionally known to apply different coating liquids in lamination using a single coating die. With regard to a coating die used for a two-layer coating device, Patent Literature 1, for example, discloses a lamination die that includes: a first body; a second body; an intermediate body provided between the first body and the second body and having a cross section of triangular shape; a first liquid passage extending from a liquid reservoir for a first coating material provided in the first body; a first discharge port communicating with the first liquid passage; a second liquid passage extending from a liquid reservoir for a second coating material provided in the second body; and a second discharge port communicating with the second liquid passage. The lamination die applies the first coating material, discharged through the first discharge port, and the second coating material, discharged through the second discharge port, in lamination onto a material to be coated.

PRIOR ART REFERENCE

Patent Literature

Patent Literature 1: Japanese Unexamined Patent Application Publication No. 2019-107606

SUMMARY OF INVENTION

The abovementioned conventional coating die includes separate discharge ports through which coating materials are respectively discharged. In this case, the discharge port for a coating material that forms the upper-layer coating film needs to be spaced away from the material to be coated by the thickness of the lower-layer coating film, compared to the discharge port for a coating material that forms the lower-layer coating film. However, if the discharge port is located away from the material to be coated, the discharge pressure of the coating material upon reaching the material to be coated will be insufficient, so that it will be difficult to form the coating film highly accurately.

Therefore, there is a limit to the distance by which the discharge port for the upper-layer coating film can be spaced away from the material to be coated. Meanwhile, if the discharge port for the upper-layer coating film is located closer to the material to be coated, on the other hand, the gap (coating gap) between the discharge port for the lower-layer coating film and the material to be coated may become excessively narrow. When the coating gap between the discharge port for the lower-layer coating film and the material to be coated is narrow, foreign matter in the coating material may be caught in the coating gap, which may cause streaks in the coating film or cutting of the material to be coated. Accordingly, highly accurate formation of a coating film will be difficult.

One aspect of the present disclosure relates to a coating die. The coating die is used to apply a first coating material and a second coating material onto a material to be coated, and the coating die includes: a first body; a second body; a first manifold that temporarily stores the first coating material; a second manifold that temporarily stores the second coating material; a discharge port that is disposed between the first body and the second body, that is longer in a second direction that intersects a first direction in which the coating die and the material to be coated are arranged, and through which the first coating material and the second coating material are discharged toward the material to be coated; an intermediate member that is provided between the first body and the second body and that becomes thinner toward the discharge port such that the first body and the second body come closer to each other; a first shim provided between the first body and the intermediate member to define a first flow passage provided from the first manifold toward the discharge port; a second shim provided between the second body and the intermediate member to define a second flow passage provided from the second manifold toward the discharge port; and a confluence passage in which the first flow passage and the second flow passage join together and that communicates with the discharge port. The first shim includes a pair of first arms arranged in the second direction between which the discharge port is located, and the second shim includes a pair of second arms arranged in the second direction between which the discharge port is located. Each first arm includes, at the tip, a first female portion formed by cutting out at least part of the first arm in a thickness direction of the first shim, and a first male portion that is arranged with the first female portion in the second direction and thicker than the first female portion. Each second arm includes, at the tip, a second female portion formed by cutting out at least part of the second arm in a thickness direction of the second shim, and a second male portion that is arranged with the second female portion in the second direction and thicker than the second female portion. The first female portion and the second male portion are engaged with each other, and the first male portion and the second female portion are engaged with each other.

Another aspect of the present disclosure relates to a coating device. The coating device includes: the coating die according to the one aspect used to apply a first coating material and a second coating material onto a material to be coated; a first supply device that supplies the first coating material to the coating die; and a second supply device that supplies the second coating material to the coating die.

Optional combinations of the aforementioned constituting elements, and implementation of the present disclosure in the form of methods, apparatuses, or systems may also be practiced as additional modes of the present disclosure.

The present disclosure can improve the accuracy of coating film formation in two-layer coating.

BRIEF DESCRIPTION OF DRAWINGS

FIG. 1 is a schematic diagram of a coating device according to a first embodiment;

DESCRIPTION OF EMBODIMENTS

Figure 2A:
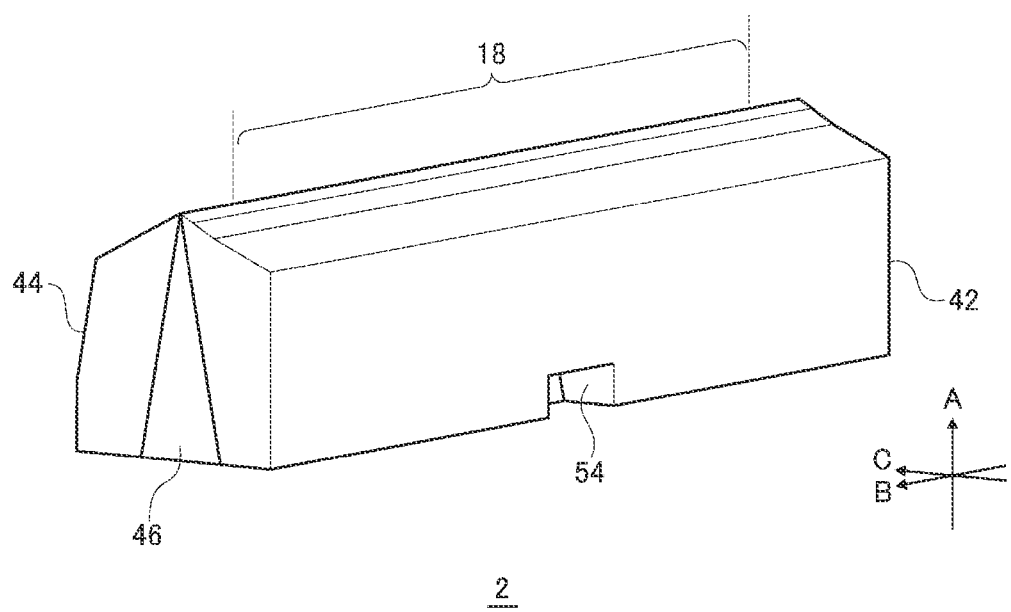
FIG. 2A is a perspective view of a coating die.

In the following, the present disclosure will be described based on preferred embodiments with reference to the drawings. The embodiments are intended to be illustrative only and not to limit the present disclosure, so that it should be understood that not all of the features or combinations thereof described in the embodiments are necessarily essential to the present disclosure. Like reference characters denote like or corresponding constituting elements, members, and processes in each drawing, and repetitive description will be omitted as appropriate. Also, the scale or shape of each component shown in each drawing is defined for the sake of convenience to facilitate the explanation and is not to be regarded as limitative unless otherwise specified. When the terms "first", "second", and the like are used in the present specification or claims, such terms do not imply any order or degree of importance and are used to distinguish one configuration from another, unless otherwise specified. Further, in each drawing, part of members less important in describing embodiments may be omitted.

First Embodiment

FIG. 1 is a schematic diagram of a coating device according to the first embodiment. A coating device 1 includes a coating die 2, a first supply device 4, and a second supply device 6.

The coating die 2 is a tool used to apply a first coating material 10 and a second coating material 12 onto a material 8 to be coated. The coating die 2 includes a first manifold 14 for temporarily storing the first coating material 10, and a second manifold 16 for temporarily storing the second coating material 12. The coating die 2 also includes a discharge port 18 through which the first coating material 10 and the second coating material 12 are discharged toward the material 8 to be coated. The discharge port 18 is slit-shaped such as to be long in a second direction B that intersects a first direction A in which the coating die 2 and the material 8 to be coated are arranged (i.e., the discharge direction of the die) and such as to be narrow in a third direction C in which a first body 42 and a second body 44, described later, are arranged.

The coating device 1 according to the present embodiment is used to manufacture electrode plates of secondary batteries. An electrode plate of a secondary battery is a sheet electrode material obtained by drying a current collector on which electrode slurry is applied. Accordingly, in the present embodiment, the material 8 to be coated is a current collector of a secondary battery. Also, at least one of the first coating material 10 or the second coating material 12 is electrode slurry of a secondary battery. As an example, the first coating material 10 and the second coating material 12 may be electrode slurry of different compositions. Also, as another example, the first coating material 10 may be electrode slurry, and the second coating material 12 may be a coating material for a heat-resistant layer and contain a ceramic material or the like as a heat-resistant material. The current collector may be metal foil, for example. The electrode slurry may be a mixture of a positive-electrode active material or a negative-electrode active material and a solvent or the like, for example. In the case of a general lithium-ion secondary battery, the positive electrode plate is prepared by applying slurry containing a positive-electrode active material, such as lithium cobalt oxide and lithium iron phosphate, onto aluminum foil. Also, the negative electrode plate is prepared by applying slurry containing a negative-electrode active material, such as graphite, onto copper foil.

The coating die 2 is disposed such that the discharge port 18 thereof faces a circumferential surface of a backup roll 20 with a certain space therebetween. The material 8 to be coated is continuously conveyed by means of rotation of the backup roll 20 to the position where the backup roll 20 and the discharge port 18 face each other. In the present embodiment, the material 8 to be coated is conveyed such as to proceed vertically from the lower side to the upper side through a gap between the backup roll 20 and the discharge port 18.

The first supply device 4 is a device that supplies the first coating material 10 to the coating die 2. The first supply device 4 includes a first tank 22, a first supply pipe conduit 24, a first pump 26, and a first valve 28. The first tank 22 stores the first coating material 10. The first supply pipe conduit 24 connects the first tank 22 and the first manifold 14. On the first supply pipe conduit 24, the first pump 26 is provided. With the first pump 26 driven, the first coating material 10 is fed from the first tank 22 to the coating die 2 side. Also, between the coating die 2 and the first pump 26 on the first supply pipe conduit 24, the first valve 28 is provided. By opening and closing the first valve 28, supply and non-supply of the first coating material 10 to the coating die 2 can be switched.

The second supply device 6 is a device that supplies the second coating material 12 to the coating die 2. The second supply device 6 includes a second tank 30, a second supply pipe conduit 32, a second pump 34, and a second valve 36. The second tank 30 stores the second coating material 12. The second supply pipe conduit 32 connects the second tank 30 and the second manifold 16. On the second supply pipe conduit 32, the second pump 34 is provided. With the second pump 34 driven, the second coating material 12 is fed from the second tank 30 to the coating die 2 side. Also, between the coating die 2 and the second pump 34 on the second supply pipe conduit 32, the second valve 36 is provided. By opening and closing the second valve 36, supply and non-supply of the second coating material 12 to the coating die 2 can be switched.

Each of the first supply device 4 and the second supply device 6 may include a return pipe conduit that connects the corresponding valve and tank, and each valve may be constituted by an intermittent valve. Each intermittent valve can switch the state where a coating material from the corresponding tank is supplied to the coating die 2 through the corresponding supply pipe conduit and the state where a coating material from the corresponding tank is returned to the tank through the corresponding return pipe conduit. Each intermittent valve supplies a coating material to the coating die 2, which discharges the coating material, so that a coating film 38 can be formed on the material 8 to be coated. Also, each intermittent valve returns a coating material to the corresponding tank, and the discharge of the coating material from the coating die 2 is stopped, so that a non-formed part 40 of the coating film 38 can be formed on the material 8 to be coated. The non-formed part 40 is used for pasting of the center lead of an electrode, for example. The structures of the first supply device 4 and the second supply device 6 are not limited to the abovementioned structures.

Figure 2B:
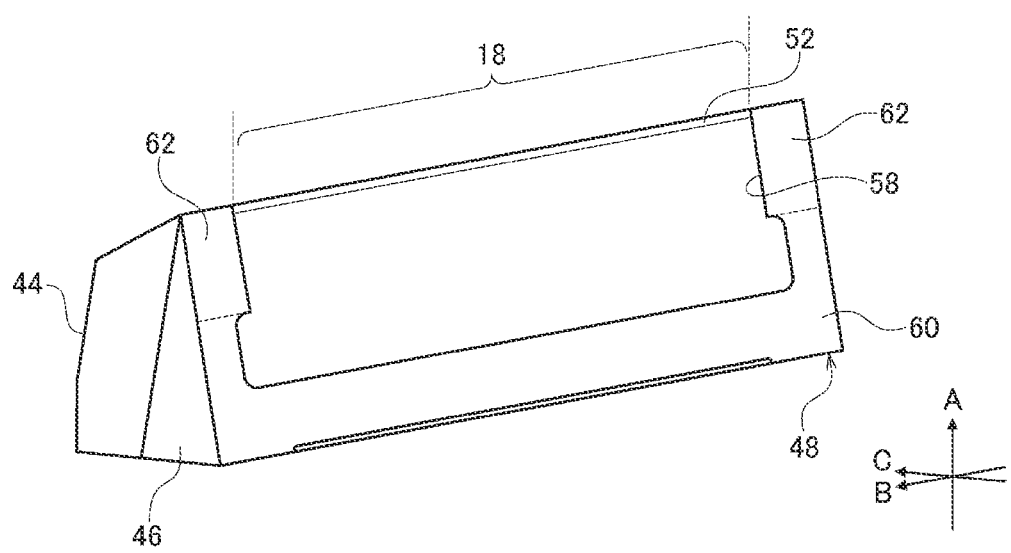
FIG. 2B is a perspective view of the coating die to which a first member is not fitted.
Figure 3:
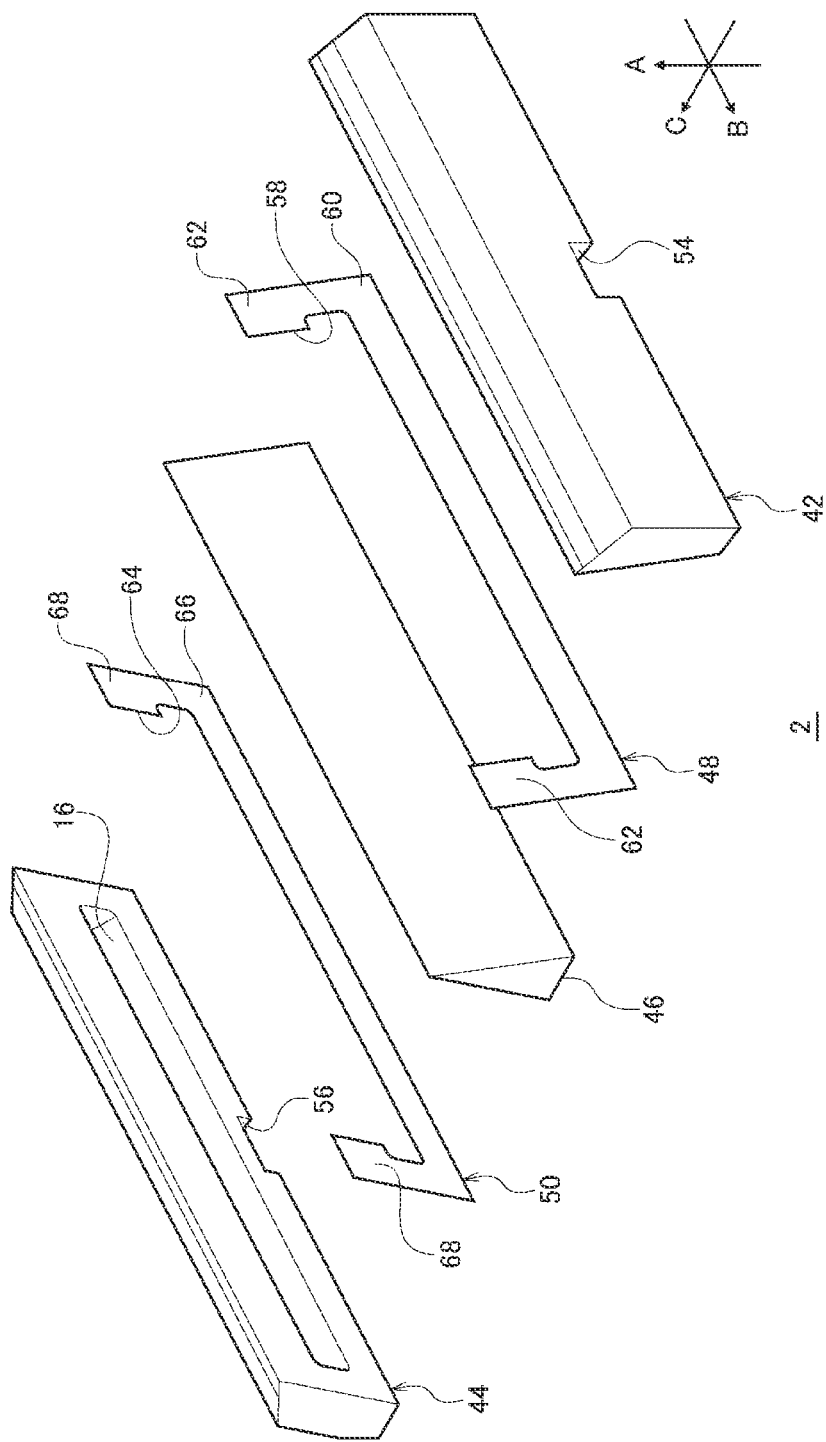
FIG. 3 is an exploded perspective view of the coating die.
Figure 4:
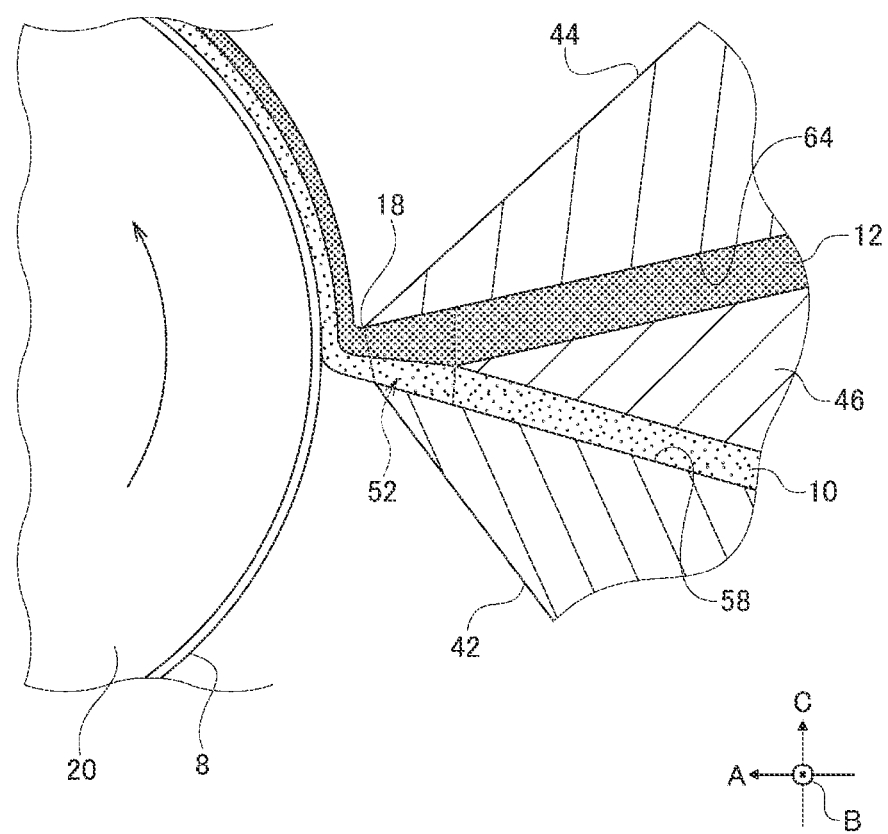
FIG. 4 is a sectional view that shows a magnified view of a region including a discharge port of the coating die.

FIG. 2A is a perspective view of the coating die 2. FIG. 2B is a perspective view of the coating die 2 to which a first member is not fitted. FIG. 3 is an exploded perspective view of the coating die 2. FIG. 4 is a sectional view that shows a magnified view of a region including the discharge port of the coating die 2. The coating die 2 includes a first body 42, a second body 44, the discharge port 18, an intermediate member 46, a first shim 48, a second shim 50, and a confluence passage 52.

The first body 42 has an elongated shape longer in the second direction B and includes the first manifold 14, and a connection part 54 to which and the first supply pipe conduit 24 is connected. On the surface of the first body 42 facing the second body 44 side, a recess is formed to be longer in the second direction B, and this recess constitutes the first manifold 14. The first manifold 14 has a rectangular opening that is longer in the second direction B. The first supply pipe conduit 24 communicates with the first manifold 14 via the connection part 54. The first manifold 14 and the connection part 54 may be provided in the intermediate member 46.

The second body 44 has an elongated shape longer in the second direction B and includes the second manifold 16, and a connection part 56 to which and the second supply pipe conduit 32 is connected. On the surface of the second body 44 facing the first body 42 side, a recess is formed to be longer in the second direction B, and this recess constitutes the second manifold 16. The second manifold 16 has a rectangular opening that is longer in the second direction B. The second supply pipe conduit 32 communicates with the second manifold 16 via the connection part 56. The second manifold 16 and the connection part 56 may be provided in the intermediate member 46.

The first body 42 is disposed on the upstream side in the conveyance direction of the material 8 to be coated (the rotating direction of the backup roll 20), and the second body 44 is disposed on the downstream side in the conveyance direction of the material 8 to be coated. Also, the coating die 2 of the present embodiment is oriented such that the first body 42 is positioned on the vertically lower side, and the second body 44 is positioned on the vertically upper side. The discharge port 18 is provided in a gap between the first body 42 and the second body 44 facing a circumferential surface of the backup roll 20. Therefore, the second direction B in which the discharge port 18 extends is horizontal.

The intermediate member 46 has an elongated shape longer in the second direction B and is provided between the first body 42 and the second body 44. Toward the discharge port 18, the intermediate member 46 becomes thinner such that the first body 42 and the second body 44 come closer to each other. When viewed from the second direction B, the intermediate member 46 of the present embodiment is triangular in shape, which becomes thinner toward the discharge port 18. For example, the intermediate member 46 is isosceles triangular or right triangular when viewed from the second direction B.

The first shim 48 is a substantially U-shaped sheet and provided between the first body 42 and the intermediate member 46. The first shim 48 defines a first flow passage 58 provided from the first manifold 14 toward the discharge port 18. More specifically, the first shim 48 includes a frame portion 60 and a pair of first arms 62. When viewed from the arrangement direction of the first body 42, the first shim 48, and the intermediate member 46 (the third direction C), the frame portion 60 surrounds three sides of a circumferential edge part of the opening of the first manifold 14 excepting the side extending in the second direction B on the discharge port 18 side. The pair of first arms 62 extend from the both ends in the second direction B of the frame portion 60 toward the backup roll 20 side. The first flow passage 58 is defined by an inner circumferential surface of the frame portion 60, the surfaces of the pair of first arms 62 facing each other, and the surfaces of the first body 42 and the intermediate member 46 facing each other. Therefore, the pair of first arms 62 are arranged in the second direction B, with the discharge port 18 located in between.

The second shim 50 is a substantially U-shaped sheet and provided between the second body 44 and the intermediate member 46. Accordingly, the second shim 50 is disposed on the downstream side of the first shim 48 in the conveyance direction of the material 8 to be coated. The second shim 50 defines a second flow passage 64 provided from the second manifold 16 toward the discharge port 18. More specifically, the second shim 50 includes a frame portion 66 and a pair of second arms 68. When viewed from the third direction C, the frame portion 66 surrounds three sides of a circumferential edge part of the opening of the second manifold 16 excepting the side extending in the second direction B on the discharge port 18 side. The pair of second arms 68 extend from the both ends in the second direction B of the frame portion 66 toward the backup roll 20 side. The second flow passage 64 is defined by an inner circumferential surface of the frame portion 66, the surfaces of the pair of second arms 68 facing each other, and the surfaces of the second body 44 and the intermediate member 46 facing each other. Therefore, the pair of second arms 68 are arranged in the second direction B, with the discharge port 18 located in between.

The confluence passage 52 is a space inside the coating die 2 where the first flow passage 58 and the second flow passage 64 join together. The confluence passage 52 is disposed between the vertex angle of the intermediate member 46 and the discharge port 18 in the first direction A and communicates with the discharge port 18. Within the confluence passage 52, the first coating material 10, which has flown from the first manifold 14 through the first flow passage 58 and reached the confluence passage 52, and the second coating material 12, which has flown from the second manifold 16 through the second flow passage 64 and reached the confluence passage 52, are laminated. The first coating material 10 and the second coating material 12 thus laminated within the confluence passage 52 are discharged in the laminated state through the discharge port 18 and applied onto the material 8 to be coated. Thus, the coating film 38 of two-layer structure is formed. The first flow passage 58 is disposed on the upstream side of the second flow passage 64 in the conveyance direction of the material 8 to be coated. Therefore, the first coating material 10 forms the lower layer of the coating film 38, and the second coating material 12 forms the upper layer of the coating film 38.

Figure 5A:
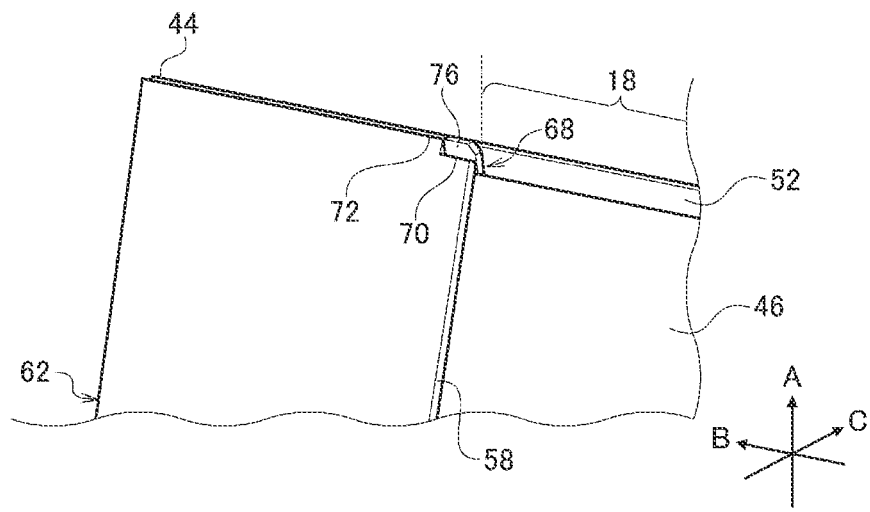
FIG. 5A is a perspective view that shows a magnified view of tip parts of a first arm and a second arm.
Figure 5B:
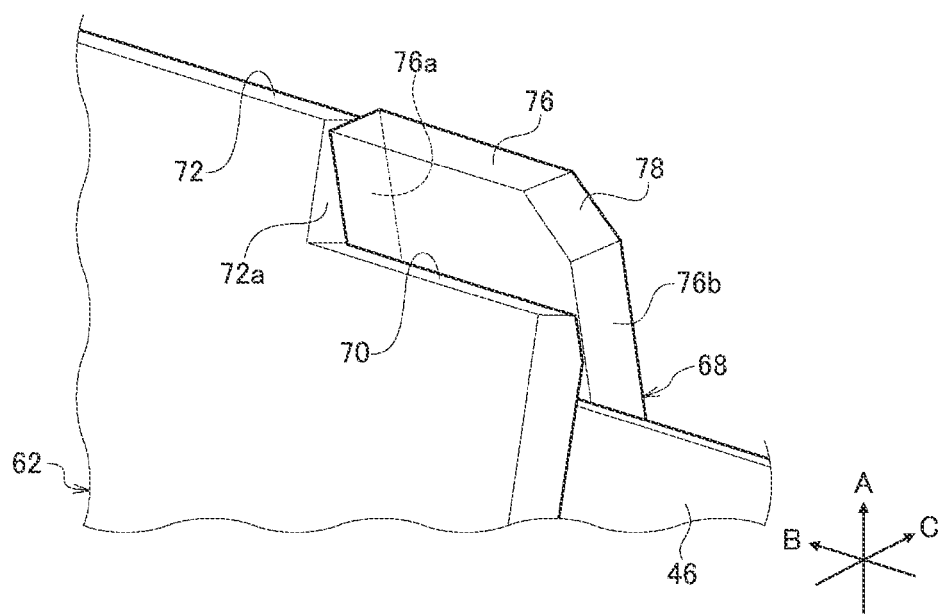
FIG. 5B is another perspective view that shows a magnified view of the tip parts of the first arm and the second arm.
Figure 6A:
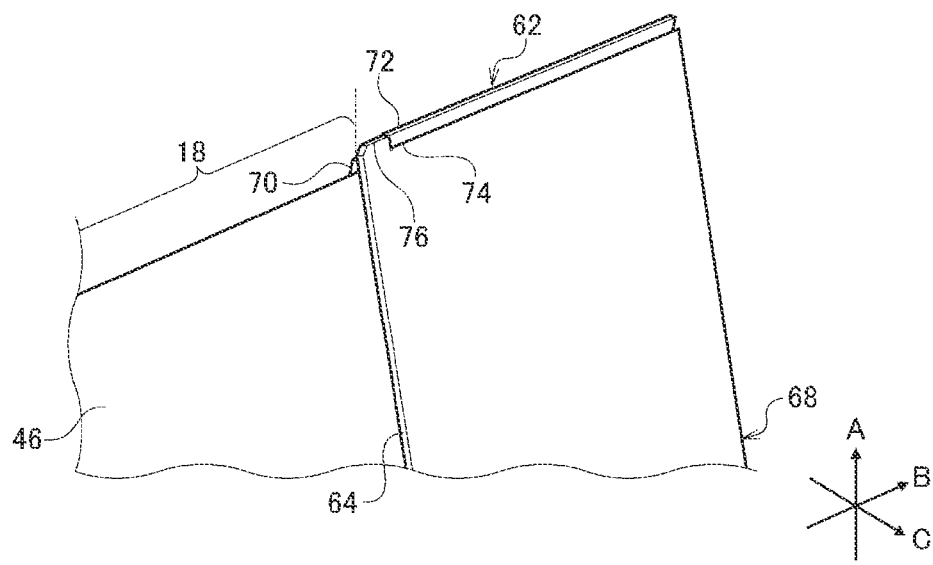
FIG. 6A is a perspective view that shows a magnified view of tip parts of a first arm and a second arm.
Figure 6B:
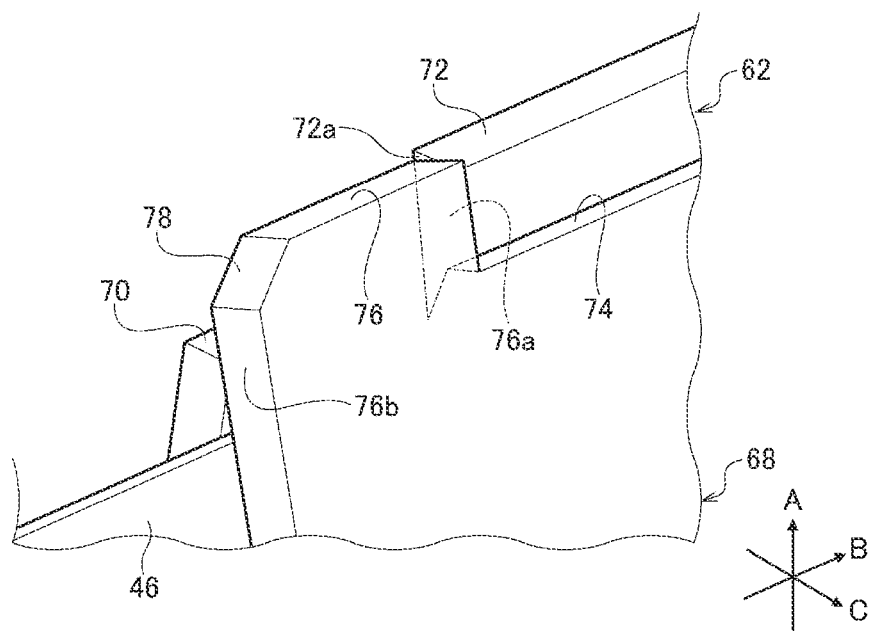
FIG. 6B is another perspective view that shows a magnified view of the tip parts of the first arm and the second arm.

In the following, the structures of the first shim 48 and the second shim 50 will be described in detail. FIGS. 5A and 5B and FIGS. 6A and 6B are perspective views that each show a magnified view of tip parts of a first arm 62 and a second arm 68. Each of FIGS. 5A and 5B illustrates the first arm 62 and the second arm 68 arranged on one end side in the second direction B of the discharge port 18. Each of FIGS. 6A and 6B illustrates the first arm 62 and the second arm 68 arranged on the other end side in the second direction B of the discharge port 18. Also, FIGS. 5A and 5B illustrate each arm observed from the first body 42 side, and FIGS. 6A and 6B illustrate each arm observed from the second body 44 side. In the present embodiment, the first arm 62 and the second arm 68 arranged on the one end side in the second direction B of the discharge port 18 have line symmetry with the first arm 62 and the second arm 68 arranged on the other end side, with respect to a virtual line, as the axis of symmetry, extending in the first direction A through the middle of the discharge port 18 in the second direction B.

Each first arm 62 includes a first female portion 70 and a first male portion 72 at the tip. The "tip" means a region on the discharge port 18 side in the first direction A with respect to the vertex part of the intermediate member 46. The first female portion 70 and the first male portion 72 are arranged in the second direction B. The first female portion 70 is a portion formed by cutting out at least part of the tip of the first arm 62, in a thickness direction of the first shim 48. The first male portion 72, on the other hand, is a portion that is not cut out in a thickness direction of the first shim 48, at the tip of the first arm 62. Therefore, the first female portion 70 is thinner (including the case where the thickness is zero) than the first male portion 72, and the first male portion 72 is thicker than the first female portion 70. Also, at least the first male portion 72 extends to a position in the first direction A substantially identical with the discharge port 18.

In the present embodiment, a partial region in the second direction B of the tip of each first arm 62 is cut out entirely in a thickness direction of the first shim 48, and the portion thus cut out constitutes the first female portion 70. In other words, the thickness of the first female portion 70 is zero. Meanwhile, the first male portion 72 has the same thickness as the first shim 48. Therefore, each first arm 62 has a tip shape in which a convex portion (the first male portion 72) protruding in the first direction A to a position substantially identical with the discharge port 18 and a concave portion (the first female portion 70) receding from the discharge port 18 along the first direction A are arranged in the second direction B.

Each second arm 68 includes a second female portion 74 and a second male portion 76 at the tip. The second female portion 74 and the second male portion 76 are arranged in the second direction B. The second female portion 74 is a portion formed by cutting out at least part of the tip of the second arm 68, in a thickness direction of the second shim 50. The second male portion 76, on the other hand, is a portion that is not cut out in a thickness direction of the second shim 50, at the tip of the second arm 68. Therefore, the second female portion 74 is thinner (including the case where the thickness is zero) than the second male portion 76, and the second male portion 76 is thicker than the second female portion 74. Also, at least the second male portion 76 extends to a position in the first direction A substantially identical with the discharge port 18.

In the present embodiment, a partial region in the second direction B of the tip of each second arm 68 is cut out entirely in a thickness direction of the second shim 50, and the portion thus cut out constitutes the second female portion 74. In other words, the thickness of the second female portion 74 is zero. Meanwhile, the second male portion 76 has the same thickness as the second shim 50. Therefore, each second arm 68 has a tip shape in which a convex portion (the second male portion 76) protruding in the first direction A to a position substantially identical with the discharge port 18 and a concave portion (the second female portion 74) receding from the discharge port 18 along the first direction A are arranged in the second direction B.

Toward the discharge port 18 in the first direction A, each first arm 62 and the corresponding second arm 68 come closer to each other. On the discharge port 18 side with respect to the vertex part of the intermediate member 46, the first female portion 70 and the second male portion 76 are engaged with each other, and the first male portion 72 and the second female portion 74 are engaged with each other. In other words, the first female portion 70 and the first male portion 72 of each first arm 62 are arranged in the second direction B reversely to the second female portion 74 and the second male portion 76 of the corresponding second arm 68. Accordingly, the first female portion 70 and the second male portion 76 are arranged at the same position in the second direction B, and the first male portion 72 and the second female portion 74 are arranged at the same position in the second direction B. When the tip of a first arm 62 and the tip of the corresponding second arm 68 are met in a region between the discharge port 18 and the vertex angle of the intermediate member 46 in the first direction A, the first female portion 70 and the second male portion 76 facing each other overlap with each other, and the first male portion 72 and the second female portion 74 facing each other overlap with each other.

Since the first female portion 70 and the second male portion 76 overlap with each other, the first arm 62 and the second arm 68 will not spread in the third direction C, and the second male portion 76 is allowed to proceed toward the discharge port 18 side. Also, since the first male portion 72 and the second female portion 74 overlap with each other, the first arm 62 and the second arm 68 will not spread in the third direction C, and the first male portion 72 is allowed to proceed toward the discharge port 18 side.

Also, since the first female portion 70 and the second male portion 76 are engaged with each other and the first male portion 72 and the second female portion 74 are also engaged with each other, a side surface 72a of the first male portion 72 facing the first female portion 70 side and a side surface 76a of the second male portion 76 facing the second female portion 74 side can be brought into contact with each other. In other words, when viewed from the second direction B, the tip of each first arm 62 and the tip of each second arm 68 overlap with each other. This can restrain the first coating material 10 and the second coating material 12 that have reached the confluence passage 52 from leaking out from an end in the second direction B of the coating die 2.

In the present embodiment, the second male portion 76 of each second arm 68 is disposed on the discharge port 18 side in the second direction B with respect to the first male portion 72. Accordingly, the discharge port 18 is defined by the first body 42, the second body 44, and the second male portions 76 of the pair of second arms 68. The discharge port 18 is substantially rectangular in shape longer in the second direction B, and a first side thereof extending in the second direction B on the upstream side in the conveyance direction of the material 8 to be coated is constituted by the tip part of the first body 42. Also, a second side thereof extending in the second direction B on the downstream side in the conveyance direction is constituted by the tip part of the second body 44. Further, the other two sides, which extend in the third direction C and connect the ends of the first side and the second side, are constituted by side surfaces 76b of the respective second male portions 76 facing each other. Therefore, the dimension in the third direction C of the discharge port 18 is determined by the thickness of the second male portions 76.

Each second male portion 76 includes a taper part 78 on the side surface 76b facing the discharge port 18 side. The taper part 78 slopes in a direction away from the discharge port 18, toward the outside of the coating die 2 (toward the material 8 to be coated) in the first direction A. By providing the taper part 78 on the tip of each side surface 76b, which forms the discharge port 18, the coating material can be made to drip outside the extending range in the second direction B of the discharge port 18. This can prevent the thickness of the end parts in a width direction (the second direction B) of the coating film 38 from becoming excessive.

As described above, the coating die 2 according to the present embodiment includes: the first body 42 including the first manifold 14 for storing the first coating material 10; the second body 44 including the second manifold 16 for storing the second coating material 12; the discharge port 18 that is longer in the second direction B, which intersects the first direction A in which the coating die 2 and the material 8 to be coated are arranged, and, through the discharge port 18, the first coating material 10 and the second coating material 12 are discharged toward the material 8 to be coated; the intermediate member 46, provided between the first body 42 and the second body 44, that becomes thinner toward the discharge port 18 such that the first body 42 and the second body 44 come closer to each other; the first shim 48 provided between the first body 42 and the intermediate member 46 to define the first flow passage 58 provided from the first manifold 14 toward the discharge port 18; the second shim 50 provided between the second body 44 and the intermediate member 46 to define the second flow passage 64 provided from the second manifold 16 toward the discharge port 18; and the confluence passage 52 in which the first flow passage 58 and the second flow passage 64 join together and that communicates with the discharge port 18.

The first shim 48 includes the pair of first arms 62 arranged in the second direction B between which the discharge port 18 is located, and the second shim 50 includes the pair of second arms 68 arranged in the second direction B between which the discharge port 18 is located. Each first arm 62 includes, at the tip, the first female portion 70 formed by cutting out at least part of the first arm 62 in a thickness direction of the first shim 48, and the first male portion 72 that is arranged with the first female portion 70 in the second direction B and thicker than the first female portion 70. Each second arm 68 includes, at the tip, the second female portion 74 formed by cutting out at least part of the second arm 68 in a thickness direction of the second shim 50, and the second male portion 76 that is arranged with the second female portion 74 in the second direction B and thicker than the second female portion 74. The first female portion 70 and the second male portion 76 are engaged with each other, and the first male portion 72 and the second female portion 74 are engaged with each other. In other words, a first arm 62 and the corresponding second arm 68 each include, at the tip, a concave portion and a convex portion arranged reversely, and the concave portion of one arm and the convex portion of the other arm are engaged with each other. In the present embodiment, the concave portions and the convex portions are concaves and convexes in a thickness direction of each shim and are also those in a surface direction of each shim.

Also, the coating device 1 according to the present embodiment includes: the coating die 2 that includes the abovementioned configurations and that applies the first coating material 10 and the second coating material 12 onto the material 8 to be coated; the first supply device 4 that supplies the first coating material 10 to the coating die 2; and the second supply device 6 that supplies the second coating material 12 to the coating die 2.

With the structure in which the first coating material 10 and the second coating material 12 are joined together in the confluence passage 52 inside the coating die 2 to be discharged through a single discharge port 18, the coating gap restrictions placed on a die provided with separate discharge ports for the first coating material 10 and the second coating material 12 can be eased. More specifically, with a single discharge port, the total dimension in the third direction C of the discharge port can be made smaller than in the case of two discharge ports, so that the coating gap tolerance can be increased. This can prevent a decrease in the discharge pressure of the coating material for the upper-layer coating film, which may be caused by a large coating gap between the discharge port for the upper-layer coating film and the material 8 to be coated, and can also prevent the occurrence of streaks or cutting of the material to be coated, which may be caused by a small coating gap between the discharge port for the lower-layer coating film and the material 8 to be coated. Therefore, the accuracy of the formation of the coating film 38 in two-layer coating can be improved.

Also, the first female portion 70 of the first shim 48 and the second male portion 76 of the second shim 50 are engaged with each other, the first male portion 72 of the first shim 48 and the second female portion 74 of the second shim 50 are engaged with each other, and the first male portion 72 and the second male portion 76 are made to intersect, thereby restraining a coating material in the confluence passage 52 from leaking out from an end in the second direction B of the coating die 2. Therefore, the accuracy of the formation of the coating film 38 can be further improved. Also, a waste of coating materials can be prevented. Further, since coating material leakage is restrained by part of the first shim 48 and the second shim 50, compared to the case where a member for preventing coating material leakage is separately provided, the number of necessary parts can be reduced, and the structure of the coating die 2 can be simplified.

Also, the second shim 50 is disposed on the downstream side of the first shim 48 in the conveyance direction of the material 8 to be coated, and the second male portion 76 is disposed on the discharge port 18 side in the second direction B with respect to the first male portion 72. Further, the second male portion 76 includes, on the side surface 76b facing the discharge port 18 side, the taper part 78 that slopes in a direction away from the discharge port 18, toward the tip of the second arm 68. This can make the thickness of the coating film 38 uniform.

Second Embodiment

The second embodiment includes configurations in common with the first embodiment, except for the shapes of the first female portion 70 and the second female portion 74. In the following, the present embodiment will be described mainly for configurations different from those in the first embodiment, and description of configurations in common will be briefly given or may be omitted.

Figure 7A:
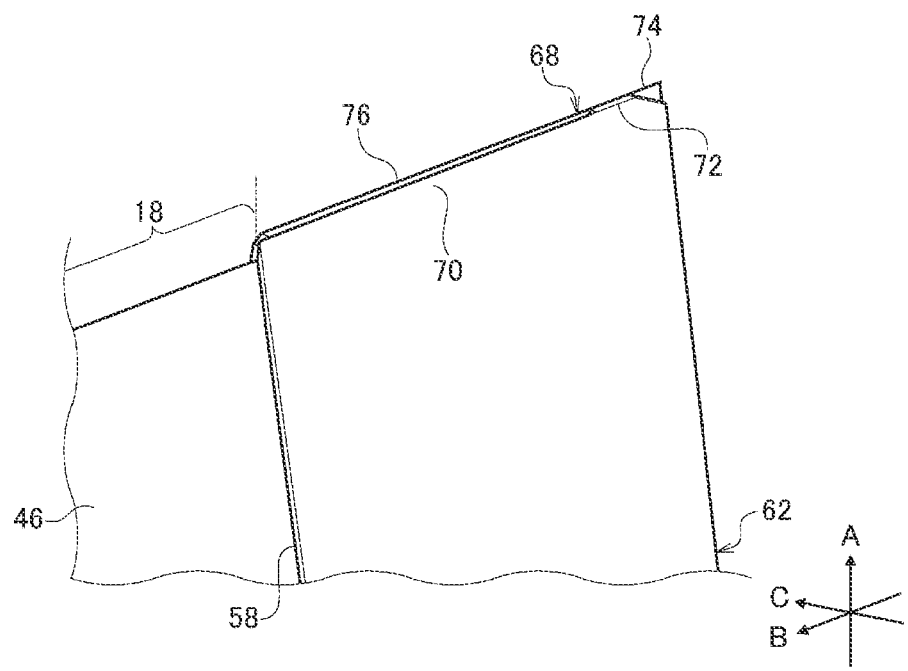
FIG. 7A is a perspective view that shows a magnified view of tip parts of a first arm and a second arm in a coating die according to a second embodiment.
Figure 7B:
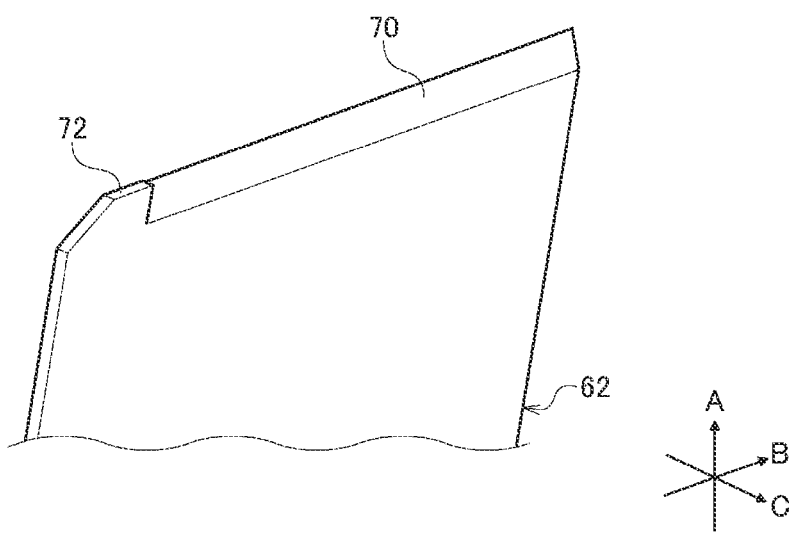
FIG. 7B is a perspective view that shows a magnified view of the tip part of the first arm.
Figure 8A:
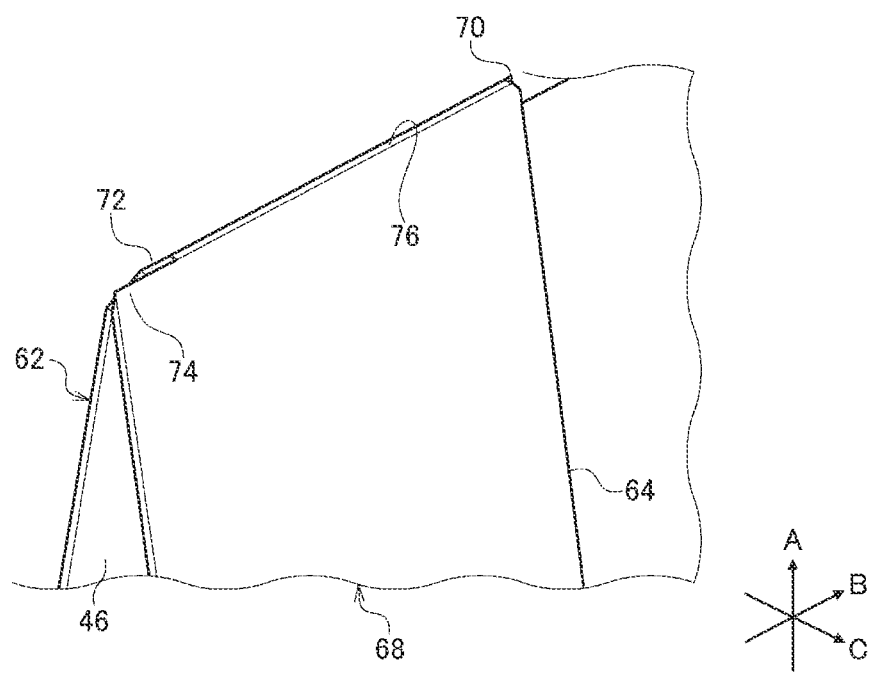
FIG. 8A is a perspective view that shows a magnified view of the tip parts of the first arm and the second arm in the coating die.
Figure 8B:
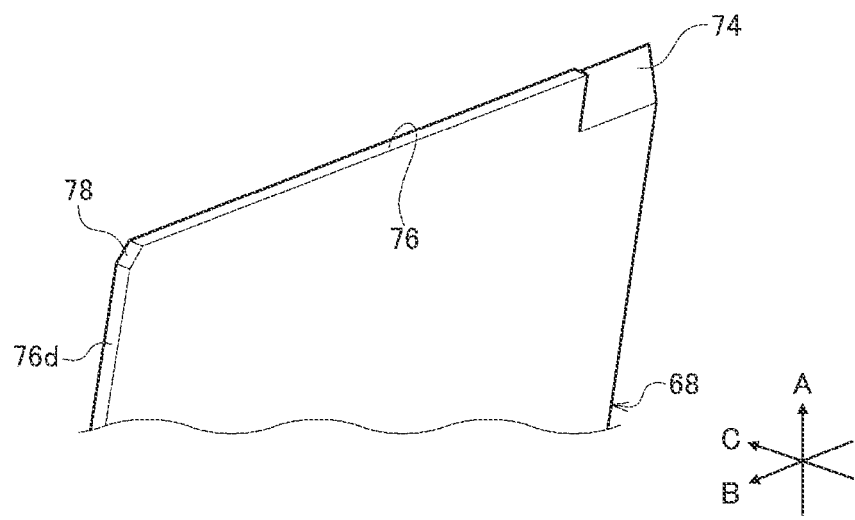
FIG. 8B is a perspective view that shows a magnified view of the tip part of the second arm.

FIG. 7A is a perspective view that shows a magnified view of the tip parts of a first arm 62 and a second arm 68 in the coating die 2 according to the second embodiment. FIG. 7B is a perspective view that shows a magnified view of the tip part of the first arm 62. FIG. 8A is a perspective view that shows a magnified view of the tip parts of the first arm 62 and the second arm 68 in the coating die 2. FIG. 8B is a perspective view that shows a magnified view of the tip part of the second arm 68. Each of FIGS. 7A, 7B, 8A, and 8B illustrates the first arm 62, the second arm 68, or both arranged on one end side in the second direction B of the discharge port 18.

Also, FIG. 7A illustrates each arm observed from the first body 42 side, and FIG. 7B illustrates the first arm 62 observed from the second body 44 side; FIG. 8A illustrates each arm observed from the second body 44 side, and FIG. 8B illustrates the second arm 68 observed from the first body 42 side. The first arm 62 and the second arm 68 arranged on the other end side in the second direction B of the discharge port 18 have line symmetry with the first arm 62 and the second arm 68 arranged on the one end side, with respect to a virtual line, as the axis of symmetry, extending in the first direction A through the middle of the discharge port 18 in the second direction B. Therefore, the illustration of the first arm 62 and the second arm 68 arranged on the other end side is omitted.

The first shim 48 includes a pair of first arms 62. The pair of first arms 62 are arranged in the second direction B, with the discharge port 18 located in between. Each first arm 62 includes a first female portion 70 and a first male portion 72 at the tip. The first female portion 70 and the first male portion 72 are arranged in the second direction B. The first female portion 70 in the present embodiment is a portion formed by cutting out part of the tip of the first arm 62, in a thickness direction of the first shim 48. The amount of cutting out gradually increases toward the outside of the coating die 2 (toward the material 8 to be coated) in the first direction A. Accordingly, the first female portion 70 has a tapered shape of which the thickness gradually decreases toward the outside of the coating die 2 in the first direction A. Meanwhile, the first male portion 72 is a portion that is not cut out in a thickness direction of the first shim 48, at the tip of the first arm 62. Therefore, the first female portion 70 is thinner than the first male portion 72, and the first male portion 72 is thicker than the first female portion 70.

The second shim 50 includes a pair of second arms 68. The pair of second arms 68 are arranged in the second direction B, with the discharge port 18 located in between. Each second arm 68 includes a second female portion 74 and a second male portion 76 at the tip. The second female portion 74 and the second male portion 76 are arranged in the second direction B. The second female portion 74 in the present embodiment is a portion formed by cutting out part of the tip of the second arm 68, in a thickness direction of the second shim 50. The amount of cutting out gradually increases toward the outside of the coating die 2 in the first direction A. Accordingly, the second female portion 74 has a tapered shape of which the thickness gradually decreases toward the outside of the coating die 2 in the first direction A. Meanwhile, the second male portion 76 is a portion that is not cut out in a thickness direction of the second shim 50, at the tip of the second arm 68. Therefore, the second female portion 74 is thinner than the second male portion 76, and the second male portion 76 is thicker than the second female portion 74.

Toward the discharge port 18 in the first direction A, each first arm 62 and the corresponding second arm 68 come closer to each other. In the confluence passage 52, the first female portion 70 and the second male portion 76 are engaged with each other, and the first male portion 72 and the second female portion 74 are engaged with each other. In other words, a first arm 62 and the corresponding second arm 68 each include, at the tip, a concave portion and a convex portion arranged reversely, and the concave portion of one arm and the convex portion of the other arm are engaged with each other. In the present embodiment, the concave portions and the convex portions are concaves and convexes in a thickness direction of each shim.

In this state, the tapered surface of the first female portion 70 comes into contact with a surface of the second male portion 76, and the tapered surface of the second female portion 74 comes into contact with a surface of the first male portion 72. This can increase the contact area between the first arm 62 and the second arm 68, thereby further restraining a coating material in the confluence passage 52 from leaking out from an end in the second direction B of the coating die 2.

Third Embodiment

The third embodiment includes configurations in common with the first embodiment, except that the coating die 2 includes a seal member. In the following, the present embodiment will be described mainly for configurations different from those in the first embodiment, and description of configurations in common will be briefly given or may be omitted.

Figure 9A:
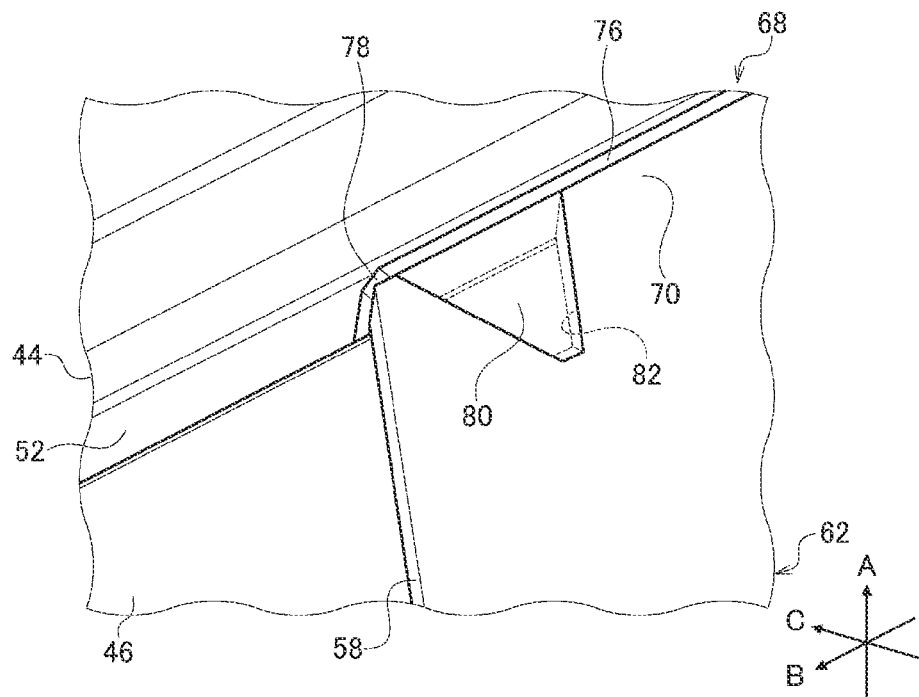
FIG. 9A is a perspective view that shows a magnified view of part of a coating die according to a third embodiment.
Figure 9B:
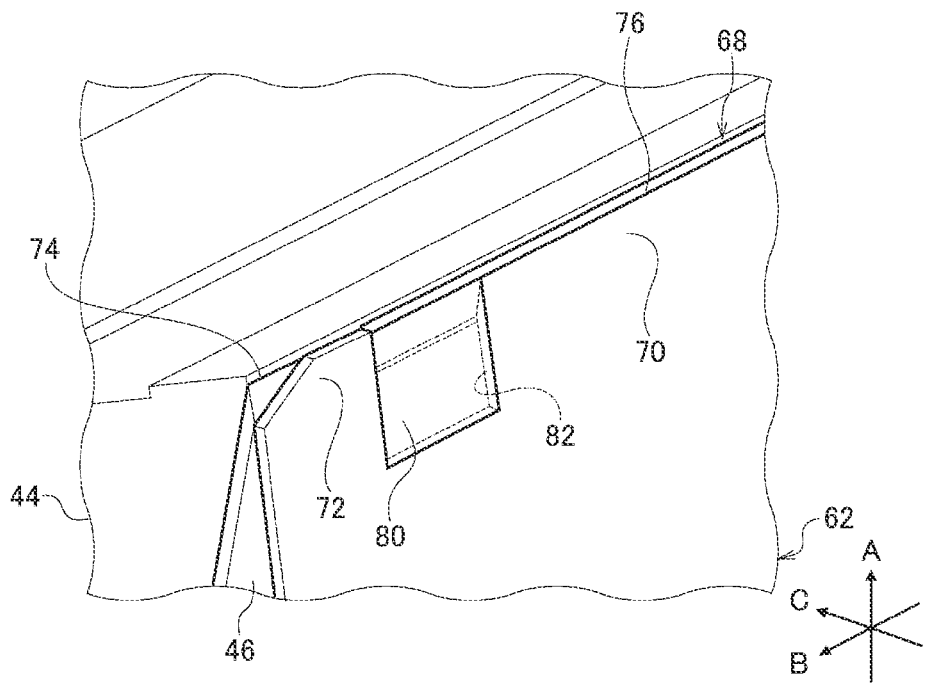
FIG. 9B is a perspective view that shows a magnified view of part of a coating die according to the third embodiment.

FIGS. 9A and 9B are perspective views that each show a magnified view of part of the coating die 2 according to the third embodiment. The coating device 1 according to the present embodiment includes a seal member 80. The seal member 80 is a packing made of a highly flexible material, such as ethylene propylene rubber. The seal member 80 is disposed in at least one of the first female portion 70 or the second female portion 74. Each of FIGS. 9A and 9B illustrates the seal member 80 disposed in the first female portion 70. In a portion in the second direction B of the first female portion 70, a cutout part 82 is provided, and the seal member 80 is fitted into the cutout part 82.

The seal member 80 disposed in the first female portion 70 is thicker than the first shim 48 before pressurization. The seal member 80 is then sandwiched and compressed between the first body 42 and the second male portion 76. Part of the seal member 80 is sandwiched and compressed between the first body 42 and the intermediate member 46. When the seal member 80 is disposed in the second female portion 74, the seal member 80 is thicker than the second shim 50 before pressurization and then sandwiched and compressed between the second body 44 and the first male portion 72. Part of the seal member 80 is sandwiched and compressed between the second body 44 and the intermediate member 46. Accordingly, a gap between the first arm 62 and the second arm 68 can be sealed by the seal member 80, thereby further restraining a coating material in the confluence passage 52 from leaking out from an end in the second direction B of the coating die 2.

When the seal member 80 is disposed near the confluence passage 52, as illustrated in FIG. 9A, the side surface of the seal member 80 on the confluence passage 52 side may suitably slope to get closer to the confluence passage 52 toward the outside of the coating die 2 in the first direction A. For example, when viewed from a normal direction of a main surface of the intermediate member 46, the seal member 80 is substantially right triangular of which the hypotenuse is positioned on the confluence passage 52 side and of which the base is positioned on the tip side of the first arm 62. Therefore, while the seal member 80 is brought closer to the confluence passage 52 to further restrain the coating material leakage from the confluence passage 52, reduction of the strength of the first arm 62, which intervenes between the seal member 80 and the confluence passage 52, can also be restrained.

When the seal member 80 is disposed near an end in the second direction B of the coating die 2, as illustrated in FIG. 9B, the shape of the seal member 80 is not particularly limited. For example, as the shape of the seal member 80, a square or the like having fewer restrictions on the assembly posture may be employed. This can simplify the operation of fitting the seal member 80.

Embodiments of the present disclosure have been described in detail. The abovementioned embodiments merely describe specific examples for carrying out the present disclosure. The embodiments are not intended to limit the technical scope of the present disclosure, and various design modifications, including changes, addition, and deletion of constituting elements, may be made to the embodiments without departing from the scope of ideas of the present disclosure defined in the claims. Such an additional embodiment with a design modification added has the effect of each of the combined embodiments and modifications. In the aforementioned embodiments, matters to which design modifications may be made are emphasized with the expression of "of the present embodiment", "in the present embodiment", or the like. However, design modifications may also be made to matters without such expression. Optional combinations of the abovementioned constituting elements may also be employed as additional modes of the present disclosure. Also, the hatching provided on the cross sections in the drawings does not limit the materials of the objects with the hatching.

REFERENCE SIGNS LIST 1 coating device
2 coating die
4 first supply device
6 second supply device
8 material to be coated
10 first coating material
12 second coating material
14 first manifold
16 second manifold
18 discharge port
38 coating film
42 first body
44 second body
46 intermediate member
48 first shim
50 second shim
52 confluence passage
58 first flow passage
62 first arm
64 second flow passage
68 second arm
70 first female portion
72 first male portion
74 second female portion
76 second male portion
78 taper part
80 seal member

The invention claimed is:

1. A coating die used to apply a first coating material and a second coating material onto a material to be coated, the coating die comprising:
    a first body;
    a second body;
    a first manifold that temporarily stores the first coating material;
    a second manifold that temporarily stores the second coating material;
    a discharge port that is disposed between the first body and the second body, that is longer in a second direction that intersects a first direction in which the coating die and the material to be coated are arranged, and through which the first coating material and the second coating material are discharged toward the material to be coated;
    an intermediate member that is provided between the first body and the second body and that becomes thinner toward the discharge port such that the first body and the second body come closer to each other;
    a first shim provided between the first body and the intermediate member to define a first flow passage provided from the first manifold toward the discharge port;
    a second shim provided between the second body and the intermediate member to define a second flow passage provided from the second manifold toward the discharge port; and
    a confluence passage in which the first flow passage and the second flow passage join together and that communicates with the discharge port, wherein
    the first shim comprises a pair of first arms arranged in the second direction between which the discharge port is located,
    the second shim comprises a pair of second arms arranged in the second direction between which the discharge port is located,
    each first arm comprises, at a tip, a first female portion formed by cutting out at least part of the first arm in a thickness direction of the first shim, and a first male portion that is arranged with the first female portion in the second direction and thicker than the first female portion,
    each second arm comprises, at the tip, a second female portion formed by cutting out at least part of the second arm in a thickness direction of the second shim, and a second male portion that is arranged with the second female portion in the second direction and thicker than the second female portion, and
    the first female portion and the second male portion are engaged with each other, and the first male portion and the second female portion are engaged with each other.

2. The coating die according to claim 1,
    wherein each of the first female portion and the second female portion has a tapered shape, and
    a thickness of the tapered shape gradually decreases toward an outside of the coating die in the first direction.

3. The coating die according to claim 1, further comprising at least one of a seal member disposed in the first female portion and sandwiched and compressed between the first body and the second male portion or a seal member disposed in the second female portion and sandwiched and compressed between the second body and the first male portion.

4. The coating die according to claim 1, wherein
the second shim is disposed on a downstream side of the first shim in a conveyance direction of the material to be coated, and
the second male portion is disposed on a discharge port side in the second direction with respect to the first male portion and comprises, on a side surface facing the discharge port side, a taper part that slopes in a direction away from the discharge port, toward an outside of the coating die in the first direction.

5. A coating device, comprising:
a coating die according to claim 1 used to apply a first coating material and a second coating material onto a material to be coated;
a first supply device that supplies the first coating material to the coating die; and
a second supply device that supplies the second coating material to the coating die.

* * * * *